Oct. 23, 1934.    J. B. MARIS    1,977,730
ELECTRIC MOTOR
Filed July 28, 1933    2 Sheets-Sheet 1

INVENTOR
James B. Maris
BY
Lyman E. Dodge
ATTORNEY

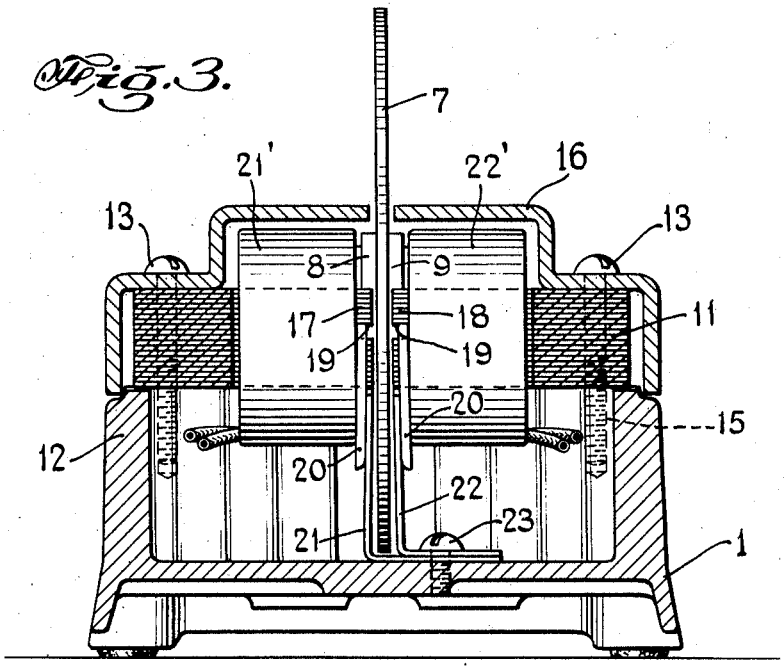

Patented Oct. 23, 1934

1,977,730

UNITED STATES PATENT OFFICE 1,977,730

ELECTRIC MOTOR

James B. Maris, Glen Ridge, N. J.

Application July 28, 1933, Serial No. 682,583

5 Claims. (Cl. 172—278)

This invention relates to electricity, especially to electric motors, and more particularly to electric motors of the single phase alternating current inductive disc type provided with shading coils upon the poles thereof.

A principal object of this invention is to increase the torque of the rotor of a motor of the type described, without increasing the watts consumed.

Other objects and advantages will appear as the description of the particular physical embodiment selected to illustrate the invention progresses, and the novel features will be particularly pointed out in the appended claims.

Figure 1:
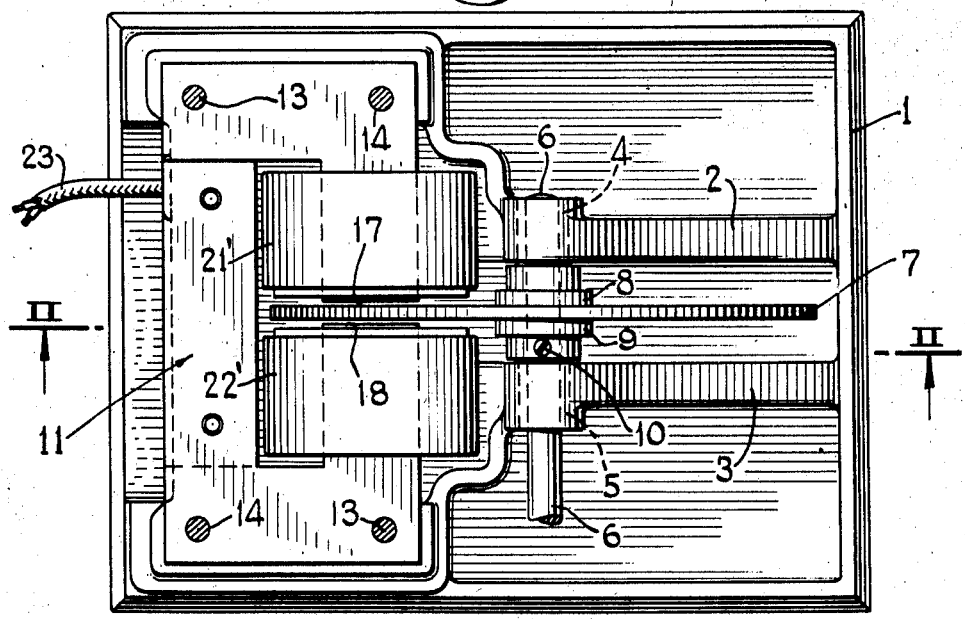
Figure 2:
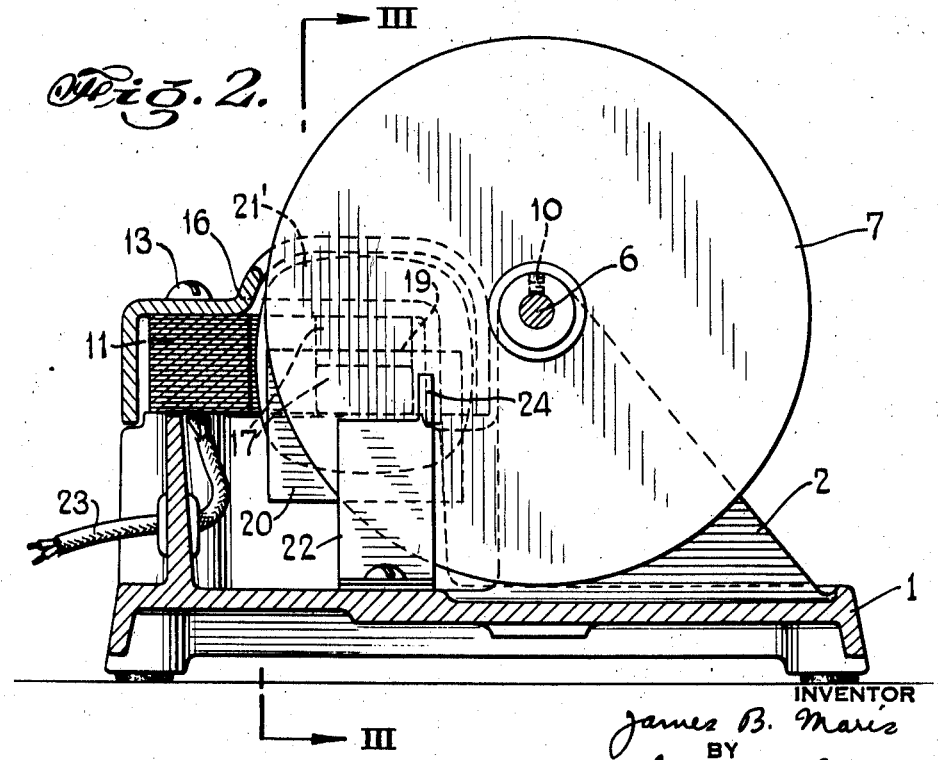

In describing the invention in detail and the particular physical embodiment selected to illustrate the invention, reference will be had to the accompanying drawings, and the several views therein in which like characters of reference designate like parts throughout the several views, and in which:

Figure 1 is a top plan view of a motor embodying applicant's invention, with a top cover removed to more clearly show the internal construction; Fig. 2 is a part side elevational, and part cross-sectional view of the device as shown by Fig. 1, taken on the plane indicated by the line II—II of Fig. 1, and viewed in the direction of the arrows at the ends of the line; Fig. 3 is a cross-sectional view of the device, on the plane indicated by the line III—III of Fig. 2, viewed in the direction of the arrows at the ends of the line; Fig. 4 is a bottom plan view of a field structure and energizing coils as used in the invention; Fig. 5 is a fragmentary end view of a pole face and associated parts as used in the invention; Fig. 6 is a fragmentary view illustrating a modified form of a magnetic path from one shaded pole to the other shaded pole as used in applicant's invention.

Applicant provides a support or base 1 having standards 2 and 3 applied thereto in any suitable or appropriate manner as by integral casting.

The standards 2 and 3 are provided with bushed bores 4 and 5 providing bearings for a shaft 6.

The shaft 6 supports a metallic disc 7, preferably copper. This disc is supported by the shaft 6 and there are flanges 8 and 9 at each side thereof positioning the disc 7. The flanges may be attached in any suitable and appropriate manner as by screws 10.

A field structure designated generally by 11, formed of magnetic material, such as iron is provided and supported upon a suitable wall 12. The field structure 11 is securely held in position upon the wall 12 in any suitable and appropriate manner, as by screws 13 passing through orifices, as 14, in the field structure, and into threaded orifices, as 15, in the wall 12. The screws 13 are also used to hold a cover 16 in place. This cover protects the internal parts from injury or undue accumulation of foreign matter.

The field structure 11 is of approximate U shape with protuberances from each leg of the U forming poles opposing each other. One pole face is designated 17 and the opposing pole face is designated 18. Each pole is provided with a slot 19, best shown in Fig. 5, within which is positioned a copper band or shading coil, as 20. The proportion of the unshaded to the shaded pole face is made as usual and the shading coil 20 is also made as usual.

Two field coils 21' and 22' connected in series are connected to the two wire conductor 23 by which energy is supplied to the coils.

All of the above describes the usual and well known single phase alternating current inductive disc type shaded pole motor.

By reference to Fig. 2, it will be seen that the slot 19 in the pole face 17 is at an angle to a radial line drawn from the center of the shaft 6 to a line at a right angle to that radial line passing through the center of the pole face 17. Applicant has found that the torque produced by the disc 7 is increased by placing the slot 19 at an angle as described.

Applicant has also provided a magnetic path from shaded pole face to shaded pole face around the disc 7. This is, perhaps, most clearly shown in Fig. 3. The magnetic material 21 is positioned on one side of the disc 7 with its upper end in proximity to the shaded pole, as best shown in Fig. 2. On the other side of the disc is the magnetic material 22, likewise having its upper end placed in proximity to the other shaded poles. One of the pieces of magnetic material, as 21, passes underneath the disc and both are secured together and to the base 1 by means of any appropriate fastening, such as a screw 23. By reference to Fig. 2, it will be seen that the member 22 not only is in proximity to the shaded pole along the lower edge of the shaded pole but also along the side edge thereof by reason of the upstanding projection 24. Both members 21 and 22 are made with such upstanding projections. These devices 21 and 22 provide a path of a certain magnetic permeability or reluctance from one shaded pole to the other shaded pole around the disc 7. The object of placing material forming a magnetic path from pole face to pole face is that by such means the torque of the motor is increased. It is probable that this path acts to bring the phase difference between the magnetic flux in the unshaded pole, as regards the magnetic flux in the shaded pole, nearer to a phase angle of 45 degrees. At any rate, the use of such members as 21 and 22 increases the torque which the motor will produce over what may be produced without them.

In Fig. 6 members 25 and 26 are shown corresponding to members 21 and 22. The members 25 and 26 are made of magnetic material and each, at the top thereof, bears directly against an unshaded pole piece. At the lower end, however, a gap 27 is formed. Each of these members 25 and 26 are held in position by screws as 28 and 29. This form of construction merely illustrates the fact that it is not necessary to separate the magnetic material from the poles, but if they are in contact with the poles, either the material must be of such dimensions or a gap as 27 must be formed so that the magnetic path will have a proper reluctance so that the torque of the motor will be increased and not decreased.

The supplementary magnetic path must be made by experiment, such that the torque is increased on the particular motor being constructed.

Although I have illustrated and described one particular physical embodiment of my invention, and explained the construction, principle and mode of operation thereof, nevertheless, I desire to have it understood that the form selected is merely illustrative but does not exhaust the possible physical embodiments of the idea of means underlying my invention.

What I claim as new and desire to secure by Letters Patent of the United States, is:

1. In a motor, in combination: a field structure of magnetic material formed to afford two separated opposing pole pieces, said opposing pole pieces each being formed with opposing faces, and of two portions; shading coils, one portion of each of the pole pieces being embraced by a shading coil; means for generating a magnetic flux in the field structure; a disc mounted to rotate between the faces of the pole pieces; and a path of magnetic permeability from one shaded pole piece portion around the disc to the other shaded pole piece portion whereby the torque of the disc is improved.

2. In a motor of the single phase alternating current induction disc type provided with pole pieces formed with both shaded and unshaded pole piece portions, magnetic material arranged on each side of the disc and affording a path for magnetic flux between shaded pole piece portions of such reluctance that the torque produced by the motor is increased.

3. In a motor, in combination: an electrically conductive disc; means for mounting the disc for rotation; a field structure of magnetic material formed with opposing separated pole faces, one on either side of the disc, each pole face formed with a slot therein; two rings of copper, one resting in each slot and embracing a portion of the pole face; magnetic material of substantially U shape extending from one embraced pole face portion around the disc to the other embraced pole face portion of sufficient magnetic permeability to substantially improve the torque of the motor; a coil on the field structure for generating a magnetic flux therein.

4. In a motor of the single phase alternating current induction disc type provided with pole pieces formed with both shaded and unshaded pole piece portions, magnetic material arranged to afford a path for magnetic flux between shaded pole piece portions of such reluctance that the torque produced by the motor is increased.

5. In a motor of the single phase alternating current induction disc type provided with pole pieces formed with both shaded and unshaded pole piece portions, magnetic material arranged to afford a path of desired permeability between shaded pole piece portions whereby the torque produced by the motor is increased.

JAMES B. MARIS.